United States Patent
Iwamura et al.

(10) Patent No.: US 8,588,800 B2
(45) Date of Patent: Nov. 19, 2013

(54) COMMUNICATION CONTROL METHOD, BASE STATION, AND USER TERMINAL

(75) Inventors: Mikio Iwamura, Yokohama (JP); Minami Ishii, Yokohama (JP); Atsushi Harada, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 507 days.

(21) Appl. No.: 12/531,654

(22) PCT Filed: Mar. 18, 2008

(86) PCT No.: PCT/JP2008/054989
§ 371 (c)(1),
(2), (4) Date: Dec. 4, 2009

(87) PCT Pub. No.: WO2008/123074
PCT Pub. Date: Oct. 16, 2008

(65) Prior Publication Data
US 2010/0113055 A1    May 6, 2010

(30) Foreign Application Priority Data

Mar. 20, 2007 (JP) ................................ 2007-073736
Dec. 11, 2007 (JP) ................................ 2007-320218

(51) Int. Cl.
*H04W 72/00* (2009.01)
*H04W 24/00* (2009.01)
*H04W 36/00* (2009.01)
*H04W 68/00* (2009.01)
*H04W 4/00* (2009.01)

(52) U.S. Cl.
USPC ........ 455/452.1; 455/423; 455/424; 455/425; 455/436; 455/458; 370/331

(58) Field of Classification Search
USPC ................. 455/423–425, 436–444, 458, 574, 455/452.1; 370/331
See application file for complete search history.

(56) References Cited

U.S. PATENT DOCUMENTS

| | | | |
|---|---|---|---|
| 6,597,679 B1 * | 7/2003 | Willars | 370/342 |
| 2005/0250512 A1 * | 11/2005 | Zhang et al. | 455/453 |
| 2007/0097914 A1 * | 5/2007 | Grilli et al. | 370/329 |
| 2007/0140153 A1 * | 6/2007 | Kono | 370/311 |

(Continued)

FOREIGN PATENT DOCUMENTS

JP      2005-176165      6/2005

OTHER PUBLICATIONS

NTT DoCoMo, "Inter-frequency/RAT Measurement Gap Control," 3GPP TSG RAN WG1 and WG2 Joint Meeting, Doc. R2-060841; Athens, Greece; Mar. 27-31, 2006, 6 pages.

(Continued)

*Primary Examiner* — Meless Zewdu
*Assistant Examiner* — Dung Hong
(74) *Attorney, Agent, or Firm* — Osha Liang LLP

(57) ABSTRACT

A communication control method used by a base station to allocate a radio resource to a user terminal which performs different-frequency measurement includes the steps of transmitting to the base station, by the user terminal, a request indicating whether a measurement gap for different-frequency measurement is needed, when a need for data communications between the user terminal and the base station arises while the user terminal is performing discontinuous reception; and controlling, by the base station, the radio resource allocated to the user terminal based on whether the measurement gap is needed.

11 Claims, 16 Drawing Sheets

(56) References Cited

U.S. PATENT DOCUMENTS

2007/0291728 A1* 12/2007 Dalsgaard et al. ............ 370/347
2008/0076427 A1* 3/2008 Huang et al. .................. 455/436
2008/0167054 A1* 7/2008 Shaheen ....................... 455/458

OTHER PUBLICATIONS

Patent Abstracts of Japan, Publication No. 2005-176165, dated Jun. 30, 2005, 1 page.
Sharp, "Measurement Gap Control for E-UTRAN," 3GPP TSG-RAN WG2 #56, Doc. R2-063283; Riga, Latvia; Nov. 6-10, 2006, 4 pages.
Nokia, "Measurements in E-UTRAN," 3GPP TSG-RAN WG2 #56, Doc. R2-063068; Riga, Latvia; Nov. 6-10, 2006, 4 pages.
NTT DoCoMo, Inc., "Measurement gap control principles," 3GPP TSG RAN WG2 #57bis, Tdoc R2-071307; St. Julian's, Malta; Mar. 26-30, 2007, 5 pages.
3GPP TS 25.331 V7.3.0, Dec. 2006, "Protocol Specification," 1302 pages.
3GPP TS 25.304 V7.1.0, Dec. 2006, "User Equipment (UE) procedures in idle mode and procedures for cell reselection in connected mode," 38 pages.
3GPP TS 36.300 V1.0.0, Mar. 2007, "Overall description," 82 pages.
International Search Report issued in PCT/JP2008/054989, mailed on Jun. 24, 2008, with translation, 9 pages.
Written Opinion issued in PCT/JP2008/054989, mailed on Jun. 24, 2008, 4 pages.

* cited by examiner

COMMUNICATION CONTROL METHOD, BASE STATION, AND USER TERMINAL

TECHNICAL FIELD

The present invention generally relates to the field of mobile communications, and specifically relates to a communication control method, a base station, and a user terminal used in a mobile communication system.

BACKGROUND ART

In the field of mobile communications, technologies are proposed which enable handover between mobile communication systems with different frequencies or different radio access technologies (RATs). For example, when a user terminal communicates in a radio access network, the user terminal may perform handover with another radio access network to continue communications due to the propagation environment or the unbalanced network load. This in turn makes it possible to distribute the load of the radio access network to other radio access networks when the radio access network becomes congested, thereby increasing the total capacity and throughput of the radio access networks. In addition, when the coverage of the radio access network in which the user terminal is in communication is intermittently broken, the user terminal can perform handover with either another radio access network or the same radio access network with a different frequency to continue communications.

FIG. 1 shows handover between radio access networks with different frequencies. In this example, cells A and B using a first frequency f1 and a cell C using a second frequency f2 coexist in the same geographical area. When the user terminal (UE: user equipment) which is in communication in the cell C using the second frequency f2 moves toward the cell boundary of the cell C (the coverage end of the second frequency f2), the coverage of the second frequency f2 may be intermittently broken. In this case, the user terminal can perform handover with the cell B using the other frequency f1 to continue communications in the cell B and outside the coverage of the second frequency f2. Handover between radio access networks with different frequencies is described in 3GPP, TS 25.331 and TS 25.304, for example.

DISCLOSURE OF INVENTION

Problem(s) to be Solved by the Invention

Since a typical user terminal cannot simultaneously tune to two frequencies, the user terminal has to suspend communications with the base station of the serving cell (the cell in which the user terminal is in communication or on standby) and tune to another frequency, in order to perform cell search with a different frequency (different-frequency measurement). Specifically, the user terminal has to temporarily place a measurement gap for different-frequency measurement during communications in the serving cell and perform different-frequency measurement during the measurement gap. During the measurement gap, the user terminal cannot communicate in the serving cell.

On the other hand, the user terminal performs discontinuous reception (DRX) in order to conserve the battery energy. Discontinuous reception refers to a power-saving technology by activating the user terminal to receive signals from the base station only when needed in the standby status. For example, in radio access systems such as UMTS (Universal Mobile Telecommunications Systems), GSM (Global System for Mobile Communications), PDC (Personal Digital Cellular), and LTE (Long Term Evolution) system which is standardized in 3GPP (the 3rd Generation Partnership Project), DRX is used in the idle (standby) mode, in which the user terminal discontinuously receives a paging channel. In LTE, DRX is also used in the active status according to data transmission or reception activities. The idle status refers to a status in which the base station has no context for the user terminal and the location of the user terminal is managed by an upper node. The active status refers to a status in which the base station has context for the user terminal and the cell (base station) within which the user terminal is situated is known in the network. In the active status, a radio bearer is established to transmit or receive data. When data activities decrease and data are not transmitted or received for more than a predetermined period of time, for example, the user terminal may change to the idle status. This in turn avoids the need to manage the location of the user terminal in each cell (base station), thereby reducing the frequency of handover and the amount of associated signaling. Once the user terminal changes to the idle status, however, the user terminal has to change to the active status when the user terminal resumes data transmission or reception. This needs signaling for the establishment of a radio bearer between the user terminal and the base station and a bearer between the base station and the upper node, thereby delaying the data transmission or reception. Accordingly, even if data activities decrease in the active status, the radio bearer may be maintained by the use of DRX. For example, in the HSDPA/HSUPA (High Speed Downlink Packet Access/High Speed Uplink Packet Access) system and LTE system, radio resources which plural user terminals share in a time division multiplexing manner are allocated to the user terminals for each subframe. An L1/L2 control channel is used for signaling the allocation of radio resources for the subframe to the user terminals to which the radio resources are allocated. Data are transmitted or received using the allocated radio resources. The user terminal receives the L1/L2 control channel during discontinuous reception and receives a shared data channel in the presence of data. Alternatively, the user terminal may receive the L1/L2 control channel and, in the presence of data, autonomously change to a continuous reception mode or a discontinuous reception mode (a DRX mode with a shorter interval, for example) which is specified upon the establishment of the radio bearer. Alternatively, the base station may specify a new DRX interval when data transmission or reception is resumed. For example, the base station may specify a DRX interval which is shorter than the DRX interval in the standby status. This in turn can reduce delay in subsequent data transmission. As used herein, discontinuous reception includes discontinuous reception by the user terminal in the idle status and the active status.

When mobile communication systems with different frequencies coexist in the same geographical area, the user terminal has to perform different-frequency measurement when needed, even during discontinuous reception. For example, when the propagation environment in the serving cell becomes poor at the coverage end of the frequency which is currently used for communications, the user terminal has to perform different-frequency measurement. The user terminal can use the measurement gap during discontinuous reception to autonomously perform different-frequency measurement. However, since the user terminal merely receives the L1/L2 control channel at predetermined intervals during discontinuous reception, the base station cannot recognize whether the user terminal is performing different-frequency measurement.

Accordingly, when the user terminal autonomously performs different-frequency measurement during discontinuous reception, there is a problem in that the base station of the serving cell cannot recognize the measurement gap, during which the base station cannot communicate with the user terminal. When the need for data transmission or reception between the base station and the user terminal arises during discontinuous reception, the base station has to allocate a radio resource to the user terminal. However, since the base station cannot recognize the measurement gap, the user terminal cannot continue performing different-frequency measurement. Alternatively, the base station may allocate a radio resource while the user station is performing different-frequency measurement, which wastes the radio resource.

When the user terminal performs different-frequency measurement during discontinuous reception, the user terminal has to perform cell search with the different frequency during the measurement gap for different-frequency measurement. Accordingly, when the timing (interval) of discontinuous reception is in synchronization with the transmission timing (interval) of the channel (a synchronization channel, a broadcast channel, etc.) used for cell search, there is a problem in that the user terminal cannot perform different-frequency measurement during discontinuous reception.

In order to solve at least one of the problems, it is a general object of the present invention for the base station to appropriately allocate a radio resource to the user terminal or for the user terminal to appropriately perform different-frequency measurement, when mobile communication systems with different frequencies coexist in the same geographical area.

Means for Solving the Problem(s)

In one aspect of the present invention, there is provided a communication control method used by a base station to allocate a radio resource to a user terminal which performs different-frequency measurement, including the steps of:

transmitting to the base station, by the user terminal, a request indicating whether a measurement gap for different-frequency measurement is needed, when a need for data communications between the user terminal and the base station arises while the user terminal is performing discontinuous reception; and controlling, by the base station, the radio resource allocated to the user terminal based on whether the measurement gap is needed.

In another aspect of the present invention, there is provided a base station for allocating a radio resource to a user terminal which performs different-frequency measurement, including:

a receiving unit configured to receive from the user terminal a request indicating whether a measurement gap for different-frequency measurement is needed, when a need for data communications with the user terminal arises while the user terminal is performing discontinuous reception; and a scheduling unit configured to control the radio resource allocated to the user terminal based on whether the measurement gap is needed.

In another aspect of the present invention, there is provided a user terminal for performing different-frequency measurement, including:

a request transmitting unit configured to transmit a request indicating whether a measurement gap for different-frequency measurement is needed, when a need for data communications with the base station arises while the user terminal is performing discontinuous reception; and a receiving unit configured to receive data with a radio resource which is allocated based on whether the measurement gap is needed.

In another aspect of the present invention, there is provided a communication control method used by a user terminal to perform different-frequency measurement, including the step of:

setting a discontinuous reception interval to a value other than multiples of a transmission interval of a channel used for different-frequency measurement.

Advantageous Effect of the Invention

According to an embodiment of the present invention, the base station can appropriately allocate a radio resource to the user terminal for communications, when mobile communication systems with different frequencies coexist in the same geographical area. In addition, the user terminal can appropriately perform different-frequency measurement.

DETAILED DESCRIPTION OF THE PREFERRED EMBODIMENTS

Figure 1:
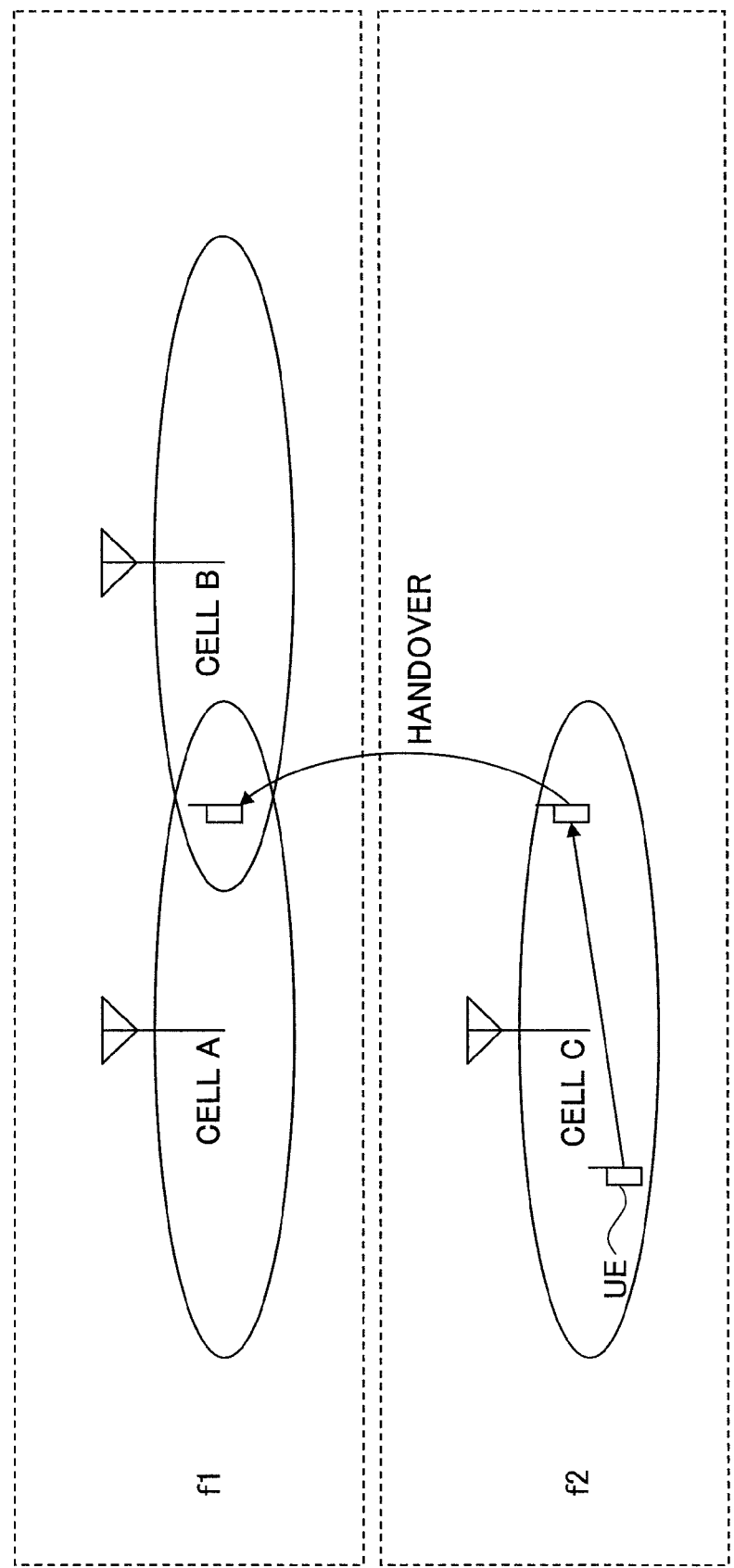
FIG. 1 shows a schematic diagram of handover between radio access networks with different frequencies.

Description of Notations 10 base station
101 reception RF unit
103 control unit
105 scheduling unit
107 transmission RF unit
20 user terminal
201 reception RF unit
203 L1/L2 processing unit
205 RRC processing unit
207 control unit
209 measuring unit
211 transmission RF unit

BEST MODE OF CARRYING OUT THE INVENTION

With reference to the accompanying drawings, a description is given below with regard to embodiments of the present invention.

When mobile communication systems with different frequencies coexist in the same geographical area, a user terminal can perform different-frequency measurement according to its own determination rather than according to an instruction from a base station. Particularly when the currently-used DRX interval is sufficiently long, the user terminal can perform different-frequency measurement using the gap during discontinuous reception. Accordingly, the user terminal can autonomously perform different-frequency measurement without receiving the instruction from the base station. This in turn can reduce the amount of signaling at the beginning or end of different-frequency measurement. In addition, the user terminal can perform appropriate measurements based on the propagation environment for the user terminal, measurement processing speed, or the like. In the following descriptions, it is assumed that the user terminal can perform different-frequency measurement according to its own determination when signal quality (SIR, reception power, path loss, CQI, a time-average value thereof, or the like) in the serving cell is below a predetermined threshold. It is also assumed that the user terminal can stop different-frequency measurement according to its own determination when signal quality in the serving cell is above the predetermined threshold.

<The Case where Downlink Data are Generated while a User Terminal is Performing Different-Frequency Measurement>

Figure 2:
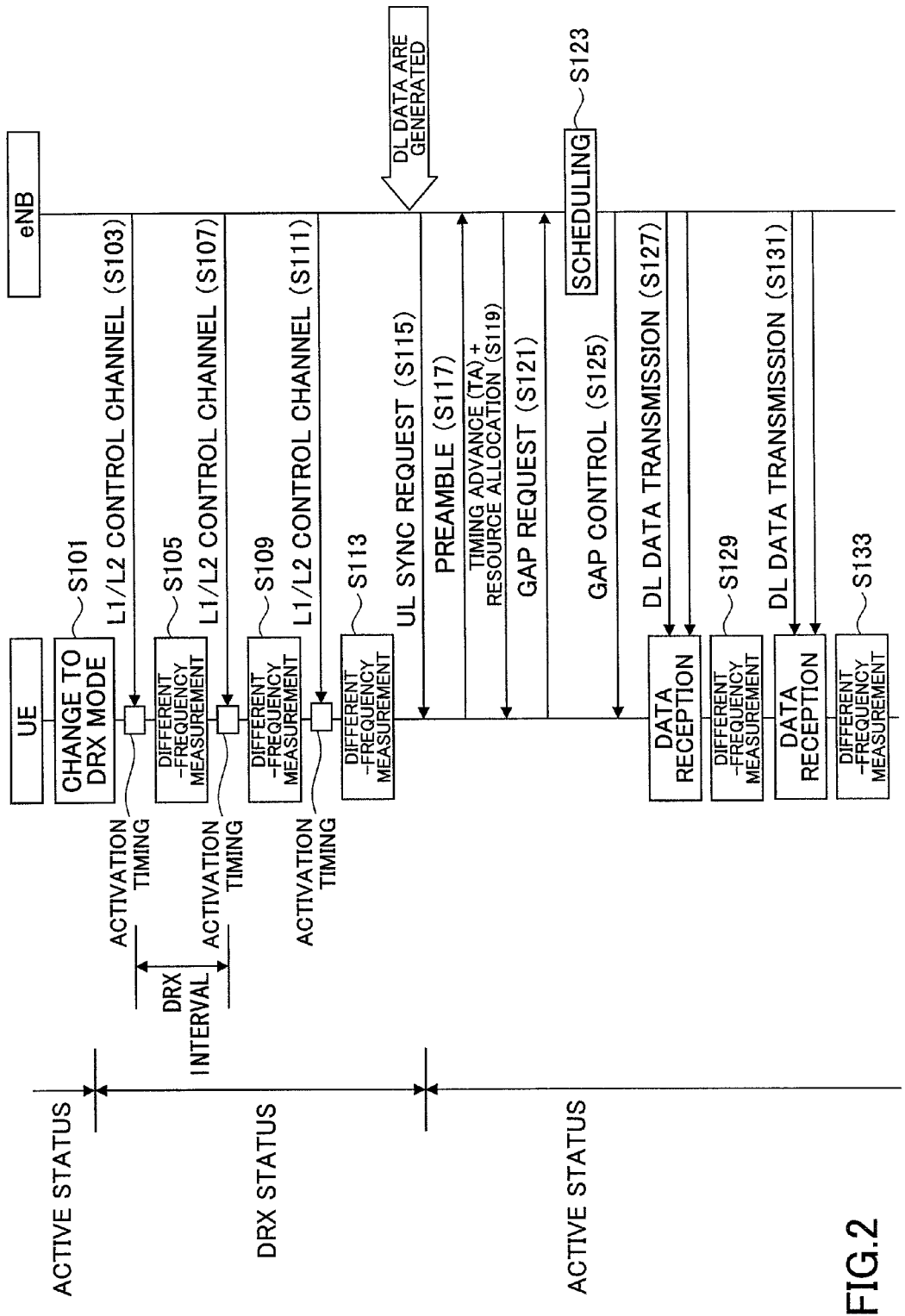
FIG. 2 shows a sequence diagram of an operations example in accordance with an embodiment of the present invention (in the case where downlink data are generated while a user terminal is performing different-frequency measurement).
Figure 3:
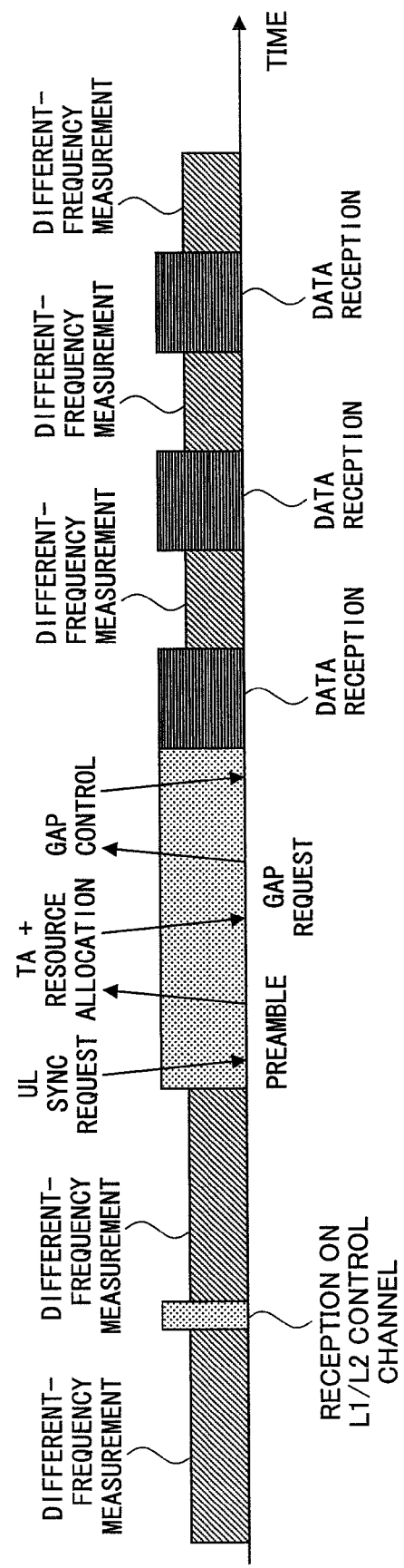
FIG. 3 shows a timing diagram in a user terminal corresponding to FIG. 2.

With reference to FIGS. 2 and 3, an operations example is described below in the case where downlink data are generated while the user terminal is performing different-frequency measurement. FIG. 2 shows a sequence diagram of an operations example in accordance with an embodiment of the present invention.

While the user terminal (UE) transmits or receives data to or from the base station (eNB), the user terminal is in an active status, which is also referred to as a continuous reception mode. When a predetermined period of time has elapsed since the end of data transmission or reception, the user terminal changes to a discontinuous reception (DRX) mode (S101).

During discontinuous reception, the user terminal receives and demodulates a control signal (for example, L1/L2 control channel) (S103). When there is enough duration to perform different-frequency measurement between activation timings, the user terminal performs different-frequency measurement according to its own determination (S105). For example, when signal quality (SIR, reception power, path loss, CQI, a time-average value thereof, or the like) in the serving cell is below a predetermined threshold, the user terminal performs different-frequency measurement according to its own determination. When the user terminal performs different-frequency measurement during discontinuous reception, the user terminal tunes to the frequency of the serving cell to receive the L1/L2 control channel and tunes to the different frequency to perform different-frequency measurement. At the next reception timing on the L1/L2 control channel, the user terminal tunes to the frequency of the serving cell to receive a control signal (S107). In this manner, the user terminal repeats the reception on the L1/L2 control channel and different-frequency measurement (S109, S111, S113).

When downlink data from the base station are generated during the discontinuous reception mode, the base station transmits an uplink synchronization request (UL Sync Request) (S115). When the user terminal receives the uplink synchronization request, the user terminal transmits a preamble on a random access channel (RACH) (S117). When the base station receives the preamble, the base station transmits a timing advance (TA) which indicates timing adjustment needed for synchronization and allocates a radio resource (Grant) for the purpose of receiving control information indicating whether the user terminal is performing different-frequency measurement (S119). The user terminal uses the allocated radio resource to transmit the control information indicating whether the user terminal is performing different-frequency measurement. In the shown example, the user terminal transmits a gap request indicating that the measurement gap is needed, since the user terminal is performing different-frequency measurement (S121). When the base station receives the gap request, the base station recognizes that the user terminal is performing different-frequency measurement. For this reason, the base station performs scheduling to allocate radio resources for downlink data with the spacing therebetween for the measurement gap during which the user terminal performs different-frequency measurement, rather than continuously transmit downlink data (S123). The base station transmits a gap control to notify the user terminal of the measurement gap (S125), transmits downlink data according to the scheduling (S127), and then allows for the spacing for the measurement gap during which the user terminal performs different-frequency measurement. The user terminal performs different-frequency measurement during the measurement gap (S129). After the end of the measurement gap, the base station resumes downlink data transmission according to the scheduling (S131). In this manner, the user terminal repeats the reception of downlink data and different-frequency measurement (S133).

FIG. 3 shows a timing diagram which illustrates the flowchart of FIG. 2 on the time axis from the viewpoint of the user terminal. When downlink data are generated while the user terminal is performing different-frequency measurement in the discontinuous reception mode, reception of the uplink synchronization request, transmission of the preamble, reception of the timing advance and allocation of the radio resource, transmission of the gap request, and reception of the gap control are performed in the order shown in FIG. 2. Then, data reception and different-frequency measurement are alternately performed.

The base station may control the duration of the radio resource assigned to downlink data transmission and the duration assigned to different-frequency measurement based on QoS for data communications. In the case of loose delay requirements, a longer duration (for example, 100 ms) may be assigned to downlink data transmission and a longer duration (for example, 100 ms) may be also assigned to different-frequency measurement. In the case of strict delay requirements such as voice communications, a shorter duration (for example, 10 ms) may be assigned to downlink data transmission and a shorter duration (for example, 10 ms) may be also assigned to different-frequency measurement.

It should be noted that the gap request may be transmitted as a MAC control PDU or an RRC message on the dedicated control channel. For example, the need for the measurement gap may be transmitted with one bit of information. Since a scheduler which controls allocation of radio resources in the base station has to recognize the measurement gap, it is preferable, for the purpose of simplifying the protocol design, to transmit the gap request as a protocol message on the MAC layer in which the scheduler resides. Also, it is preferable, for the purpose of employing retransmission features on the MAC layer and security features, to transmit the gap request as the RRC message. Alternatively, the gap request may be transmitted as a measurement report (MEASUREMENT REPORT) in the RRC protocol. When the measurement report satisfies a predetermined condition, the base station may determine that the measurement report corresponds to the gap request. For example, the user terminal may report the propagation level in the serving cell as the measurement report. When the report value (the propagation level) is below a predetermined threshold, the base station may determine that the measurement report corresponds to the gap request. Although the user terminal does not explicitly transmit the gap request in this case, the user terminal implicitly transmits the gap request by means of the measurement report.

When the RRC message is used, the user terminal transmits the measurement report under predetermined conditions. For example, the predetermined conditions include when the propagation level is below a predetermined threshold (first condition), when the measurement gap is not allocated (second condition), and when there is not enough duration to perform different-frequency measurement between reception timings of control signals (for example, L1/L2 control channel) during discontinuous reception (third condition). The measurement report is transmitted, when all of the predetermined conditions are satisfied. The third condition prevents the measurement report from being immediately transmitted when the first condition and the second condition are satisfied, even if there is enough duration to perform different-frequency measurement during discontinuous reception. When downlink data from the base station are generated, the user terminal changes to the continuous reception mode. At this moment, the third condition is satisfied and thus the measurement report is transmitted.

It should be noted that a persistent scheduling mode may be used in LTE, in which data are transmitted during the discontinuous reception mode. In the persistent scheduling mode, the user terminal periodically receives data (discontinuously receives data) using predetermined radio resources (time resources and frequency resources). When retransmission according to HARQ is needed, the user terminal receives retransmission data at the timing of discontinuous reception. Accordingly, when the persistent scheduling mode is used, the duration of different-frequency measurement during discontinuous reception may vary. For this reason, enough duration to perform different-frequency measurement may not be reserved. Thus, the third condition may be defined as the third condition when the persistent scheduling mode is used.

In the conventional discontinuous reception mode, the radio resource is not allocated upon downlink data transmission (S119). In the embodiment shown in FIGS. 2 and 3, the radio resource for transmitting at least one bit of information needs to be allocated for the purpose of transmitting the gap request (for example, 0=need for the gap request; 1=no need for the gap request). Alternatively, a preamble used when the gap request is needed and another preamble when the gap request is not needed may be defined in advance in the system, and the user terminal may specify the gap request with the type of the preamble. These preambles may be specified by means of the uplink synchronization request. In this example, steps S117 and S121 in FIG. 2 can be simultaneously carried out and only the timing advance is transmitted to the user terminal in step S119. Alternatively, a dedicated resource such as ACK/NACK or CQI (channel quality indicator) or a channel for the scheduling request may be used instead of the radio resource for transmitting the gap request.

The radio resource (at least one bit) for transmitting the gap request is preferably provided only for the cell or the user terminal in which different-frequency measurement is needed. In other words, in the environment where cells with different frequencies do not overlap or in the user terminal which does not support different-frequency measurement, the radio resource for the gap request may not be provided. Whether the gap request is needed is specified as an RRC message on the broadcast channel. Alternatively, it may be specified as a MAC control PDU or an RRC message on the dedicated control channel or may be individually specified upon the establishment of the radio bearer.

FIGS. 2 and 3 show procedures in which data communications are resumed in the out-of-synchronization status. It should be noted that the uplink synchronization request (S121), the preamble (S117), and the timing advance (S119) are not needed when synchronization is maintained by periodic uplink feedback of sounding reference signals or CQIs (channel quality indicators) in the discontinuous reception mode.

As described above, when downlink data from the base station are generated while the user terminal is performing different-frequency measurement in the discontinuous reception mode, the user terminal transmits the gap request indicating that the measurement gap is needed. When the base station receives the gap request, the base station allocates radio resources for downlink data with the spacing therebetween for the measurement gap during which the user terminal performs different-frequency measurement. The base station transmits the gap control to the user terminal. The gap control may include a specific parameter (for example, a gap pattern, the length of the gap, the number of repetitions, etc.) for the measurement gap. Alternatively, the gap control may be a command to initiate a parameter specified upon the establishment of the radio bearer, for example. In this manner, the base station can recognize the status of different-frequency measurement by the user terminal and allocate radio resources. In addition, the user terminal can continue performing different-frequency measurement.

<The Case where Uplink Data are Generated While a User Terminal is Performing Different-Frequency Measurement>

Figure 4:
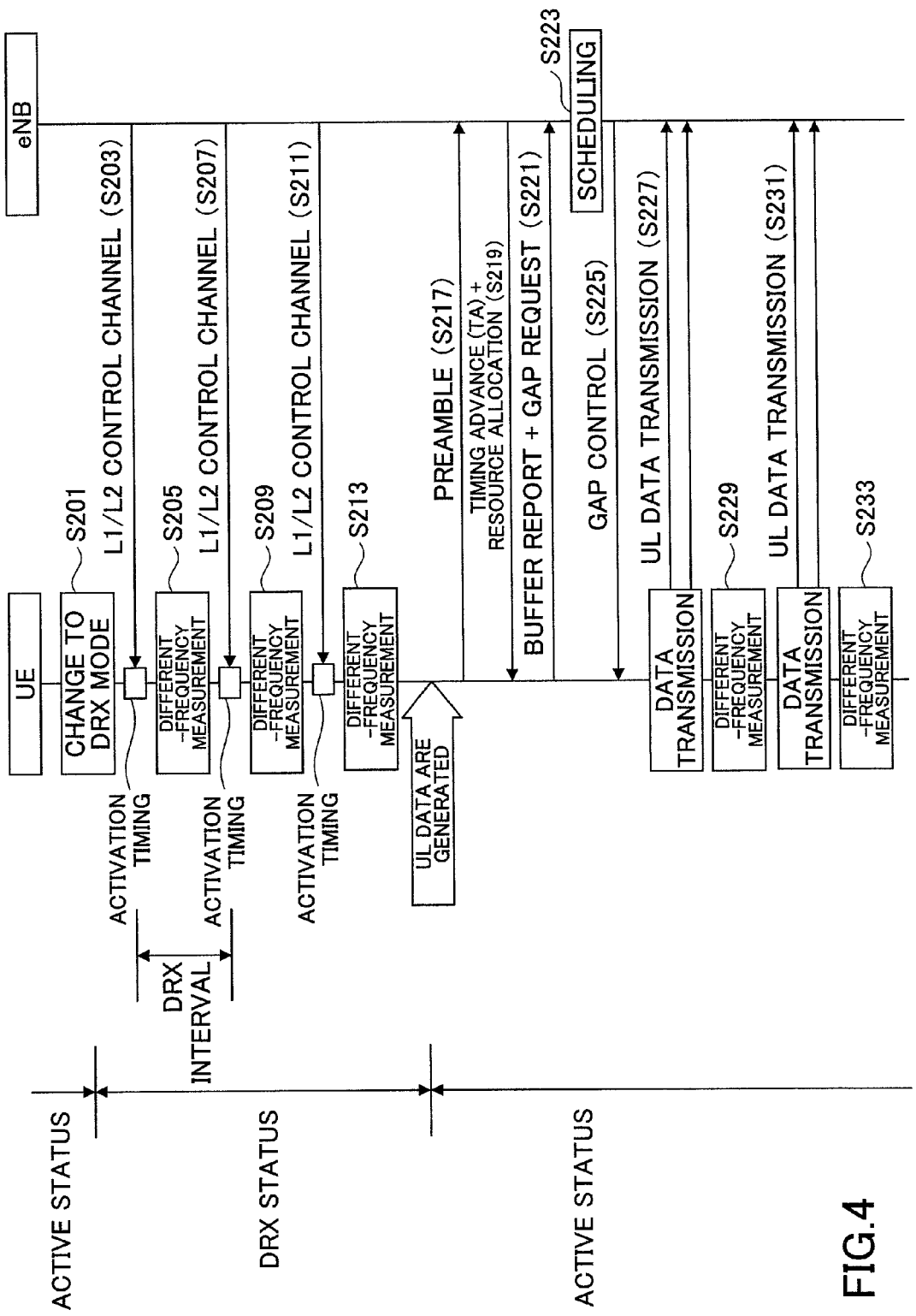
FIG. 4 shows a sequence diagram of an operations example in accordance with an embodiment of the present invention (in the case where uplink data are generated while a user terminal is performing different-frequency measurement).
Figure 5:
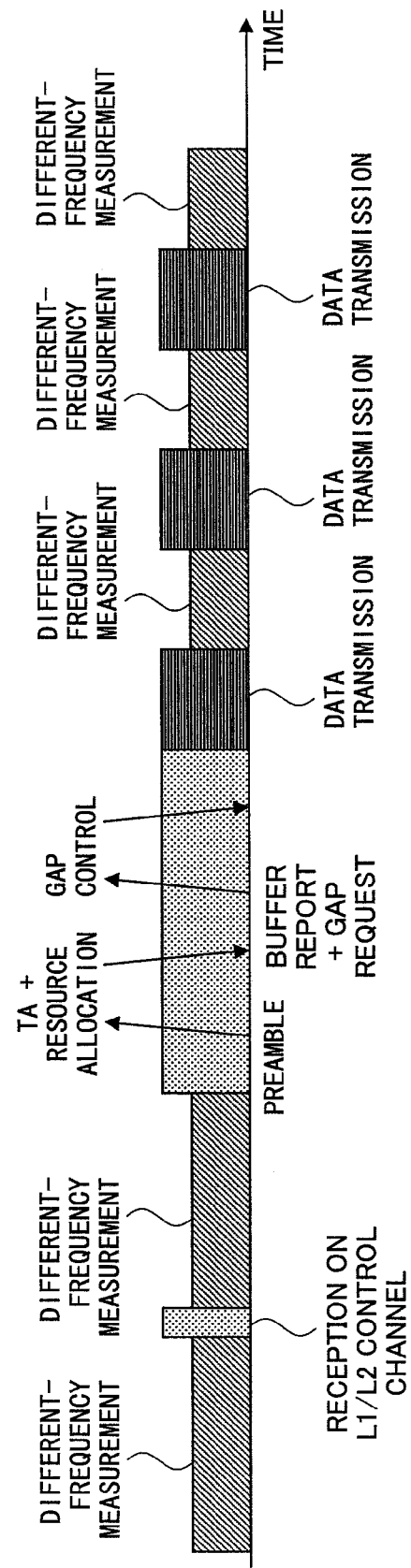
FIG. 5 shows a timing diagram in a user terminal corresponding to FIG. 4.

With reference to FIGS. 4 and 5, an operations example is described below in the case where uplink data are generated while the user terminal is performing different-frequency measurement. FIG. 4 shows a sequence diagram of an operations example in accordance with an embodiment of the present invention.

Steps S201 through S213 are the same as steps S101 through S113 in FIG. 2 and their discussion is thus omitted.

When uplink data from the user terminal are generated during the discontinuous reception mode, the user terminal transmits a preamble on a random access channel (RACH) (S217). When the base station receives the preamble, the base station transmits a timing advance (TA) which indicates timing adjustment needed for synchronization and allocates a radio resource (Grant) for the purpose of receiving control information indicating whether the user terminal is performing different-frequency measurement (S219). The user terminal uses the allocated radio resource to transmit the control information indicating whether the user terminal is performing different-frequency measurement. In the shown example, the user terminal transmits a gap request indicating that the measurement gap is needed, since the user terminal is performing different-frequency measurement. At the same time, the user terminal transmits a buffer status report including information (a data type, the amount of data, etc.) about uplink data to be transmitted (S221). When the base station receives the gap request, the base station recognizes that the user terminal is performing different-frequency measurement. For this reason, the base station performs scheduling to allocate radio resources for uplink data with the spacing therebetween for the measurement gap during which the user terminal performs different-frequency measurement, rather than continuously allocate radio resources for uplink data (S223). The base station transmits a gap control to notify the user terminal of the measurement gap (S225), and then the user terminal transmits uplink data according to the scheduling (S227). The user terminal performs different-frequency measurement during the measurement gap (S229). In this manner, the user terminal repeats the transmission of uplink data and different-frequency measurement (S231, S233).

FIG. 5 shows a timing diagram which illustrates the flowchart of FIG. 4 on the time axis from the viewpoint of the user terminal. When uplink data are generated while the user terminal is performing different-frequency measurement in the discontinuous reception mode, transmission of the preamble, reception of the timing advance and allocation of the radio resource, transmission of the gap request, and reception of the gap control are performed in the order shown in FIG. 4. Then, data transmission and different-frequency measurement are alternately performed.

As described above, when uplink data from the user terminal are generated while the user terminal is performing different-frequency measurement in the discontinuous reception mode, the user terminal transmits the gap request indicating that the measurement gap is needed. When the base station receives the gap request, the base station allocates radio resources for uplink data with the spacing therebetween for the measurement gap during which the user terminal performs different-frequency measurement. In this manner, the base station can recognize the status of different-frequency measurement by the user terminal and allocate radio resources. In addition, the user terminal can continue performing different-frequency measurement.

It should be noted that the gap request may be transmitted as a MAC control PDU or an RRC message (for example, a measurement report) on the dedicated control channel.

<The Case where Data Transmission or Reception is Completed>

Figure 6:
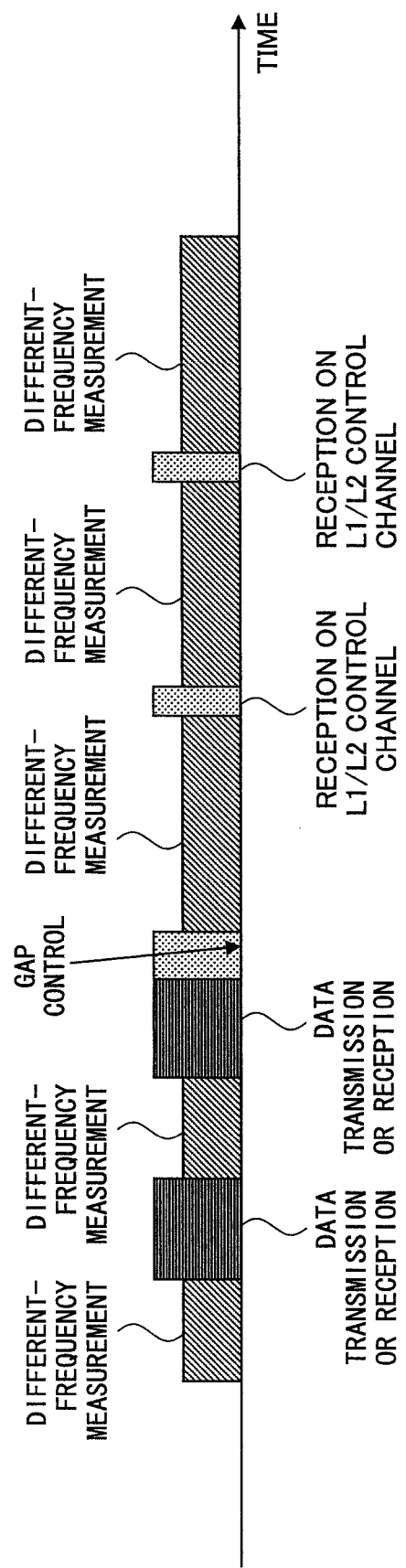
FIG. 6 shows a timing diagram in a user terminal in the case where data transmission or reception is completed.

With reference to FIG. 6, an operations example is described below in the case where data transmission or reception is completed after data transmission or reception and different-frequency measurement are repeated as shown in FIG. 3 or FIG. 5.

When a predetermined period of time has elapsed since the end of data transmission or reception, the base station instructs the user terminal to change to the discontinuous reception (DRX) mode. At this moment, it is preferable that the base station instruct the user terminal to change the discontinuous reception mode with a longer DRX interval, such that the user terminal can perform different-frequency measurement.

When the user terminal changes to the discontinuous reception mode, the user terminal can perform different-frequency measurement between reception timings on the L1/L2 control channel. The user terminal may determine that there is enough duration to perform different-frequency measurement when the DRX interval received from the base station is above a predetermined threshold, and then may perform different-frequency measurement. On the other hand, the user terminal may determine that there is not enough duration to perform different-frequency measurement when the DRX interval received from the base station is below a predetermined threshold, and then may not perform different-frequency measurement. In this case, the user terminal may perform different-frequency measurement when a longer DRX interval is received or selected.

<The Case where Different-Frequency Measurement is Completed>

Figure 7:
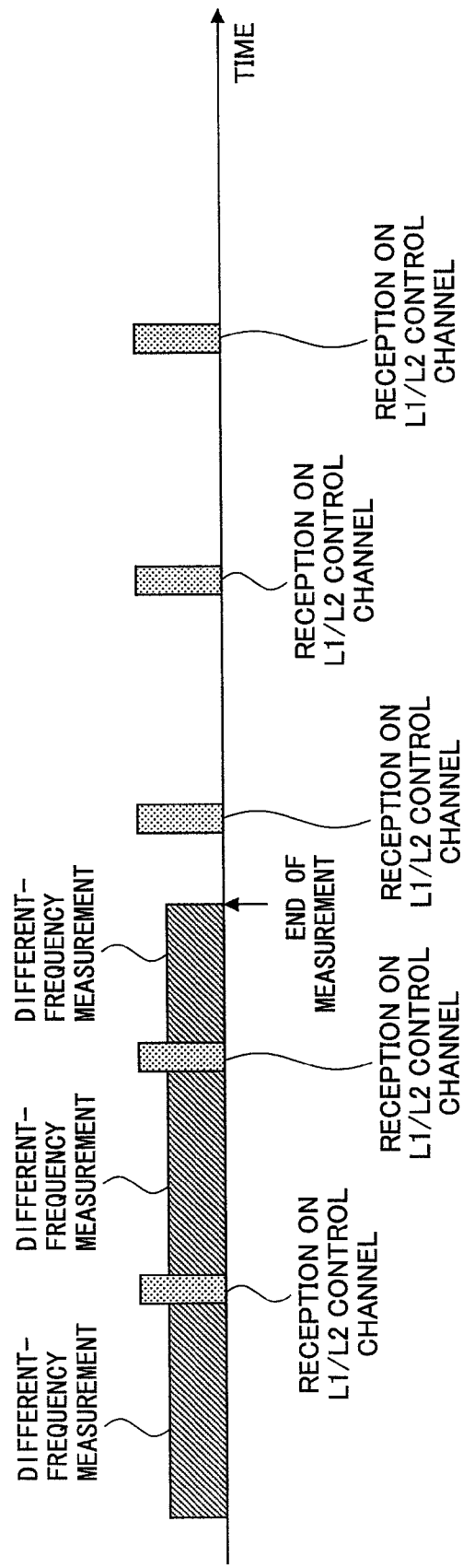
FIG. 7 shows a timing diagram in a user terminal in the case where different-frequency measurement is completed.

With reference to FIG. 7, an operations example is described below in the case where different-frequency measurement is completed in the discontinuous reception mode as shown in FIG. 6.

In the discontinuous reception mode, the user terminal stops different-frequency measurement according to its own determination. For example, the user terminal stops different-frequency measurement when signal quality (SIR, reception power, path loss, CQI, a time-average value thereof, or the like) in the serving cell is above a predetermined threshold. In this case, the user terminal changes to the typical discontinuous reception mode without transmitting control information to the base station. Then, the user terminal continues receiving the L1/L2 control channel at predetermined intervals.

<The Case where Downlink Data are Generated while a User Terminal Stops Different-Frequency Measurement>

Figure 8:
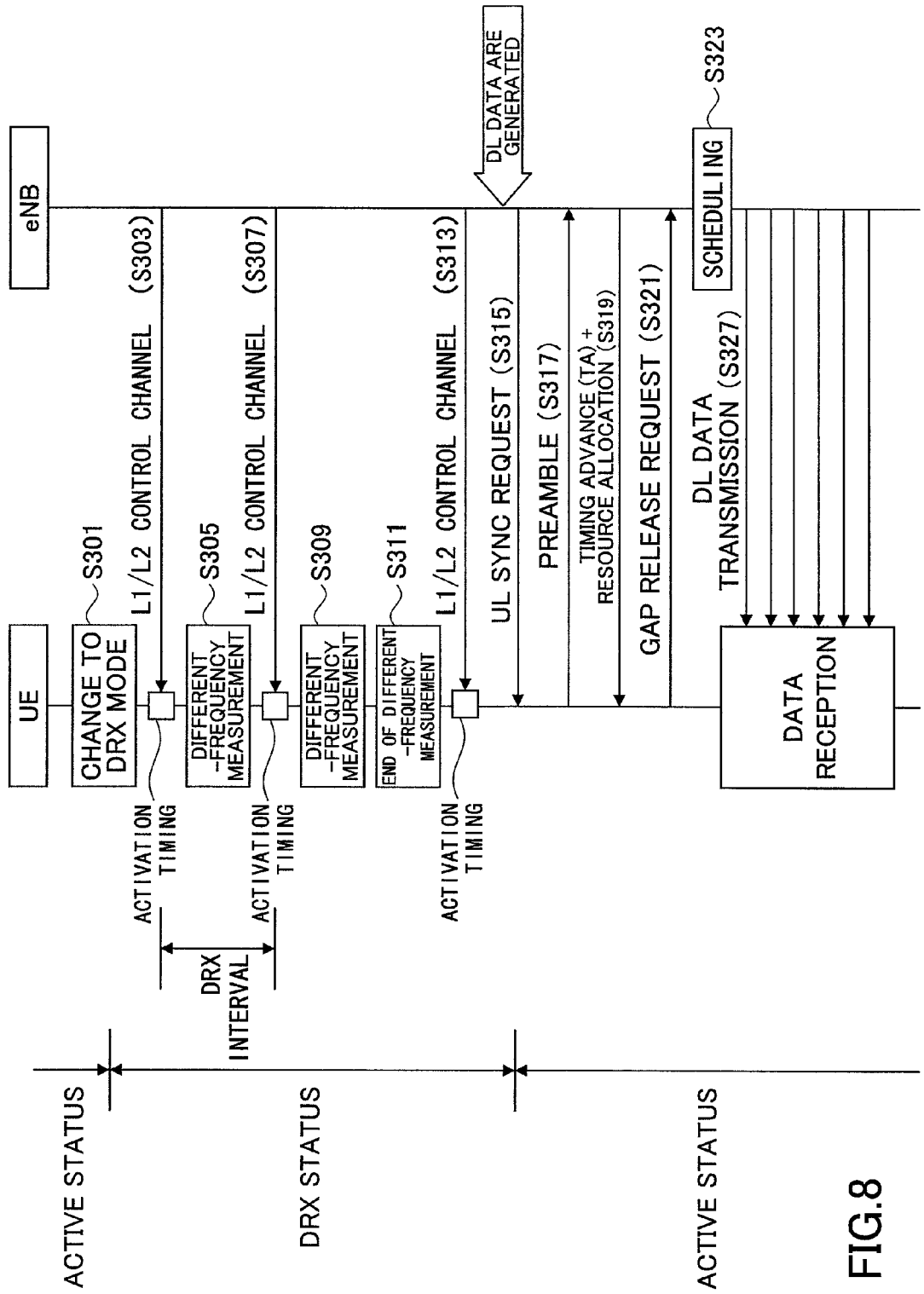
FIG. 8 shows a sequence diagram of an operations example in accordance with an embodiment of the present invention (in the case where downlink data are generated while a user terminal stops different-frequency measurement).
Figure 9:
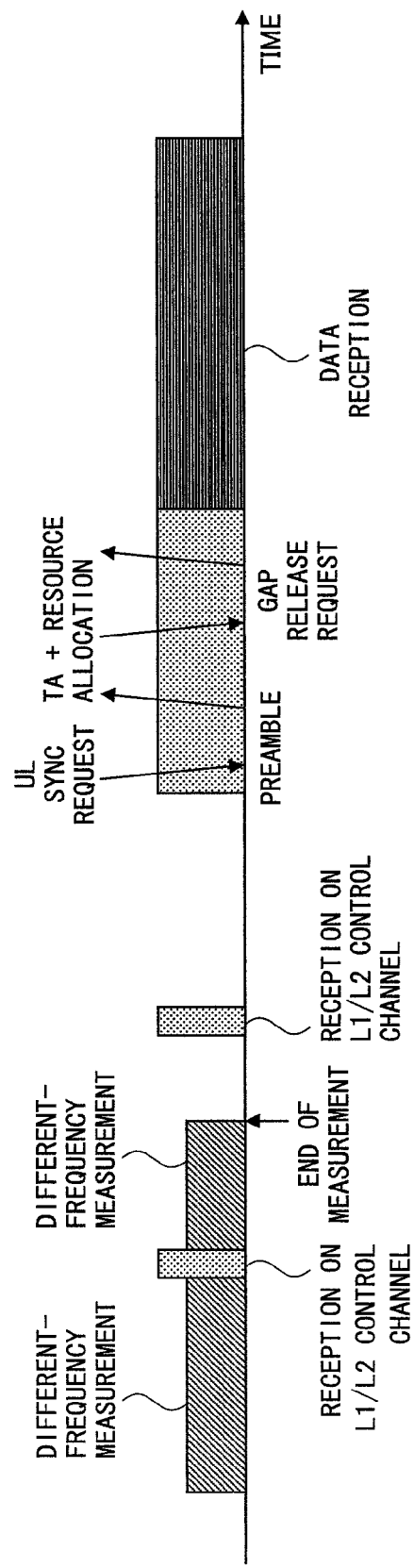
FIG. 9 shows a timing diagram in a user terminal corresponding to FIG. 8.

With reference to FIGS. 8 and 9, an operations example is described below in the case where downlink data are generated while the user terminal stops different-frequency measurement as shown in FIG. 7. FIG. 8 shows a sequence diagram of an operations example in accordance with an embodiment of the present invention.

Steps S301 through S309 are the same as steps S101 through S109 in FIG. 2 and their discussion is thus omitted. As shown in FIG. 7, the user terminal stops different-frequency measurement according to its own determination (S311). After stopping different-frequency measurement, the user terminal changes to the typical discontinuous reception mode. Specifically, the user terminal receives and demodulates control signals (for example, L1/L2 control channel) at predetermined intervals (S313).

When downlink data from the base station are generated during the discontinuous reception mode, the base station transmits an uplink synchronization request (UL Sync Request) (S315). When the user terminal receives the uplink synchronization request, the user terminal transmits a preamble on a random access channel (RACH) (S317). When the base station receives the preamble, the base station transmits a timing advance (TA) which indicates timing adjustment needed for synchronization and allocates a radio resource (Grant) for the purpose of receiving control information indicating whether the user terminal is performing different-frequency measurement (S319). The user terminal uses the allocated radio resource to transmit the control information indicating whether the user terminal is performing different-frequency measurement. In the shown example, the user terminal transmits a gap release request indicating that the measurement gap is not needed, since the user terminal stops different-frequency measurement (S321). When the base station receives the gap release request, the base station recognizes that the user terminal stops different-frequency measurement. For this reason, the base station performs scheduling to allocate radio resources for downlink data without the spacing therebetween for the measurement gap during which the user terminal performs different-frequency measurement, in order to continuously transmit downlink data (or in order to transmit downlink data at intervals suitable for data transmission) (S323). The base station transmits downlink data according to the scheduling (S327).

FIG. 9 shows a timing diagram which illustrates the flowchart of FIG. 8 on the time axis from the viewpoint of the user terminal. When downlink data are generated while the user terminal stops different-frequency measurement in the discontinuous reception mode, reception of the uplink synchronization request, transmission of the preamble, reception of the timing advance and allocation of the radio resource, and transmission of the gap release request are performed in the order shown in FIG. 8. Then, continuous data reception is performed.

As described above, when downlink data from the base station are generated while the user terminal stops different-frequency measurement in the discontinuous reception mode, the user terminal transmits the gap release request indicating that the measurement gap is not needed. When the base station receives the gap release request, the base station allocates radio resources for downlink data without the spacing therebetween for the measurement gap. In this manner, the base station can recognize the status of different-frequency measurement by the user terminal and allocate radio resources.

It should be noted that the gap release request may be transmitted as a MAC control PDU or an RRC message (for example, a measurement report) on the dedicated control channel.

When the RRC message is used, the user terminal transmits the measurement report under predetermined conditions. For example, the predetermined conditions include when the propagation level is above a predetermined threshold (first condition), when the measurement gap is allocated (second condition), and when there is not enough duration to perform different-frequency measurement between reception timings of control signals (for example, L1/L2 control channel) during discontinuous reception (third condition). The measurement report is transmitted, when all of the predetermined conditions are satisfied. The third condition prevents the measurement report from being immediately transmitted when the first condition and the second condition are satisfied, even if there is enough duration to perform different-frequency measurement during discontinuous reception. When downlink data from the base station are generated, the user terminal changes to the continuous reception mode. At this moment, the third condition is satisfied and thus the measurement report is transmitted. It should be noted that the third condition may be replaced with the following condition: when the user terminal is in the continuous reception mode. Since there are no data to be transmitted in the discontinuous reception mode, the measurement gap may not be released even if there is not enough duration to perform different-frequency measurement between reception timings of control signals, thereby reducing the amount of signaling. The third condition may be also defined as the third condition when the persistent scheduling mode is used.

<The Case where Uplink Data are Generated While a User Terminal Stops Different-Frequency Measurement>

Figure 10:
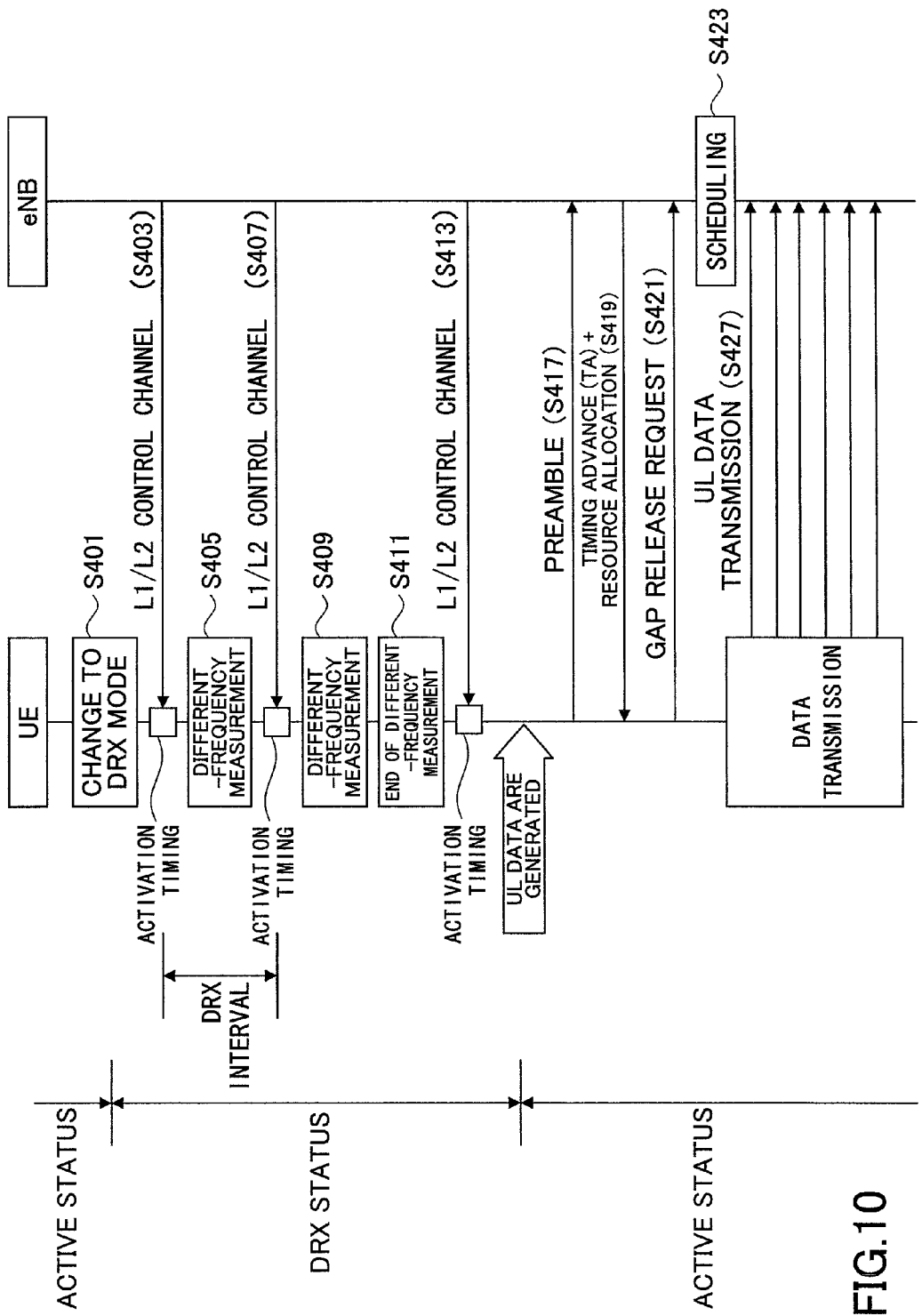
FIG. 10 shows a sequence diagram of an operations example in accordance with an embodiment of the present invention (in the case where uplink data are generated while a user terminal stops different-frequency measurement).
Figure 11:
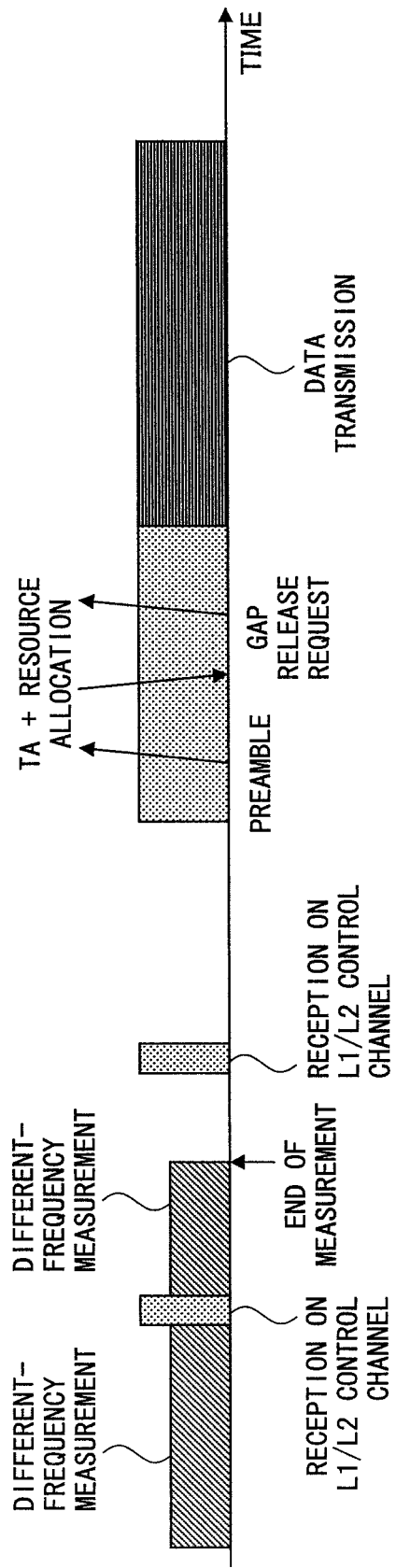
FIG. 11 shows a timing diagram in a user terminal corresponding to FIG. 10.

With reference to FIGS. 10 and 11, an operations example is described below in the case where uplink data are generated while the user terminal stops different-frequency measurement as shown in FIG. 7. FIG. 10 shows a sequence diagram of an operations example in accordance with an embodiment of the present invention.

Steps S401 through S413 are the same as steps S301 through S313 in FIG. 8 and their discussion is thus omitted.

When uplink data from the user terminal are generated during the discontinuous reception mode, the user terminal transmits a preamble on a random access channel (RACH) (S417). When the base station receives the preamble, the base station transmits a timing advance (TA) which indicates timing adjustment needed for synchronization and allocates a radio resource (Grant) for the purpose of receiving control information indicating whether the user terminal is performing different-frequency measurement (S419). The user terminal uses the allocated radio resource to transmit the control information indicating whether the user terminal is performing different-frequency measurement. In the shown example, the user terminal transmits a gap release request indicating that the measurement gap is not needed, since the user terminal stops different-frequency measurement. At the same time, the user terminal transmits a buffer status report including information (a data type, the amount of data, etc.) about uplink data to be transmitted (S421). When the base station receives the gap request, the base station recognizes that the user terminal stops different-frequency measurement. For this reason, the base station performs scheduling to allocate radio resources for uplink data without the spacing therebetween for the measurement gap during which the user terminal performs different-frequency measurement, in order to continuously receive uplink data (or in order to receive uplink data at intervals suitable for data reception) (S423). The user terminal transmits uplink data according to the scheduling (S427).

FIG. 11 shows a timing diagram which illustrates the flowchart of FIG. 10 on the time axis from the viewpoint of the user terminal. When uplink data are generated while the user terminal stops different-frequency measurement in the discontinuous reception mode, transmission of the preamble, reception of the timing advance and allocation of the radio resource, and transmission of the gap release request are performed in the order shown in FIG. 10. Then, continuous data transmission is performed.

As described above, when uplink data from the user terminal are generated while the user terminal stops different-frequency measurement in the discontinuous reception mode, the user terminal transmits the gap release request indicating that the measurement gap is not needed. When the base station receives the gap release request, the base station allocates radio resources for uplink data without the spacing therebetween for the measurement gap. In this manner, the base station can recognize the status of different-frequency measurement by the user terminal and allocate radio resources.

It should be noted that the gap release request may be transmitted as a MAC control PDU or an RRC message (for example, a measurement report) on the dedicated control channel.

<Structure of a Base Station>

Figure 12:
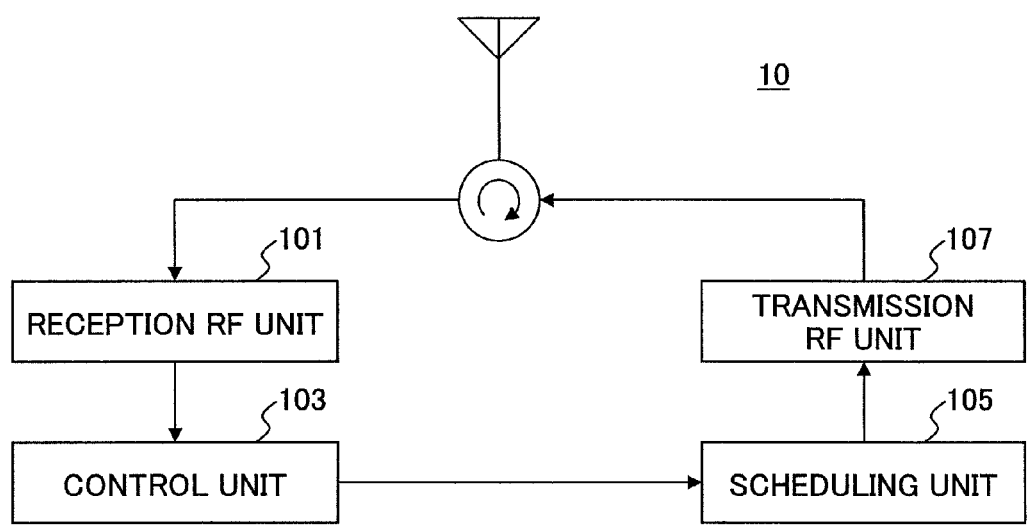
FIG. 12 shows a block diagram of a base station in accordance with an embodiment of the present invention.

FIG. 12 shows a block diagram of a base station 10 in accordance with an embodiment of the present invention. The base station 10 includes a reception RF unit 101, a control unit 103, a scheduling unit 105, and a transmission RF unit 107.

The reception RF unit 101 processes radio signals transmitted from the user terminal and extracts therefrom a control signal, a data signal, and so on. The reception RF unit 101 also extracts a request (a gap request or a gap release request) indicating whether the measurement gap for different-frequency measurement is needed by the user terminal.

Upon receiving the gap request, the control unit 103 determines the measurement gap during which the user terminal performs different-frequency measurement, and then supplies the measurement gap to the scheduling unit 105. The control unit 103 may determine the measurement gap based on QoS for data communications.

The scheduling unit 105 performs scheduling to allocate radio resources to the user terminal based on whether the measurement gap is needed. Information about the allocation is transmitted via the transmission RF unit 107 to the user terminal on the L1/L2 control channel.

<Structure of a User Terminal>

Figure 13:
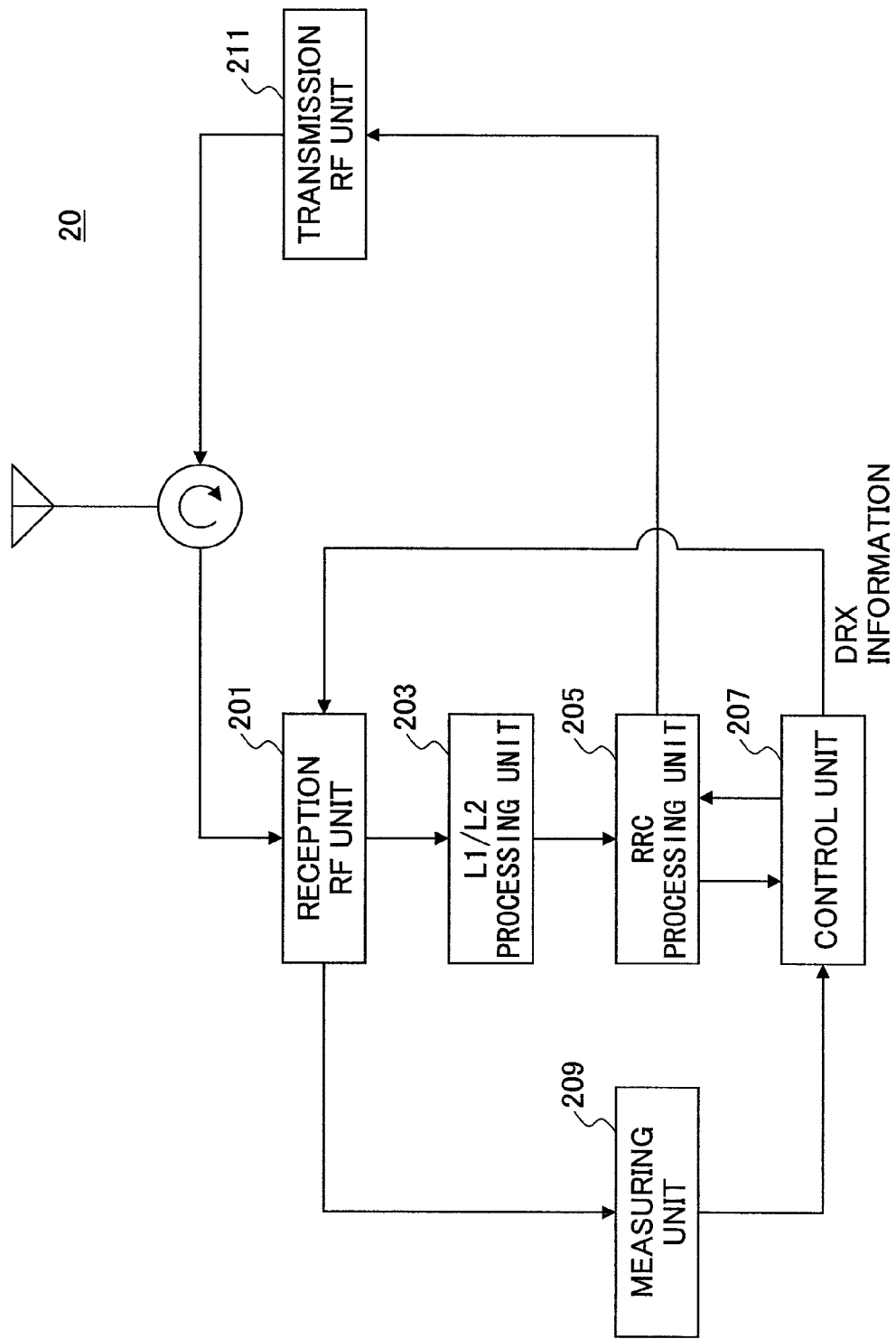
FIG. 13 shows a block diagram of a base station in accordance with an embodiment of the present invention.

FIG. 13 shows a block diagram of a user terminal 20 in accordance with an embodiment of the present invention. The user terminal 20 includes a reception RF unit 201, an L1/L2 processing unit 203, an RRC processing unit 205, a control unit 207, a measuring unit 209, and a transmission RF unit 211.

The reception RF unit 201 processes radio signals transmitted from the base station and extracts therefrom a control signal (L1/L2 control signal), a reference signal (pilot signal), a data signal, and so on. The reception RF unit 201 receives the control signal at discontinuous reception timings in the discontinuous reception mode. Discontinuous reception information (DRX information) such as discontinuous reception timings, a discontinuous reception interval, and a duration for discontinuous reception may be supplied from the control unit 207 or may be determined in advance in the system.

The L1/L2 processing unit 203 demodulates the L1/L2 control signal and extracts therefrom information about radio resource allocation, upper-layer control information, and so on. The L1/L2 control signal is received when needed in the active status, and received at the discontinuous timing in the idle status.

The RRC processing unit 205 extracts information about radio resource control (RRC). For example, the RRC processing unit 205 performs the establishment, the reestablishment, the maintenance, and the release of the RRC connection; the establishment, the modification, the release of the radio bearer; allocation of radio resources; and management of the active mode of operation and the idle mode of operation.

The control unit 207 controls each function of the user terminal based on information from the RRC processing unit 205. For example, the control unit 207 instructs the RRC processing unit 205 to transmit the gap request, when the user terminal needs to perform different-frequency measurement upon resuming data communications in the discontinuous reception mode. In addition, the control unit 207 instructs the RRC processing unit 205 to transmit the gap release request, when the user terminal need not perform different-frequency measurement upon resuming data communications in the discontinuous reception mode. When the user terminal receives the measurement gap (gap control) from the base station in response to the gap request, the control unit 207 instructs the reception RF unit 201 to tune to the different frequency during the measurement gap. In addition, the control unit 207 controls the reception RF unit 201 to perform discontinuous reception.

The measuring unit 209 performs cell search with a frequency different from the frequency used in the cell in which the user terminal is in communication or on standby. During cell search, received quality of the reference signal transmitted in the neighboring cell is measured. When the received quality in the neighboring cell becomes better, the measuring unit 209 instructs the control unit 207 to perform handover with the cell using the different frequency when needed.

The transmission RF unit 211 transmits data in the user terminal to the base station.

<Setting of a Discontinuous Reception (DRX) Interval>

Figure 14:
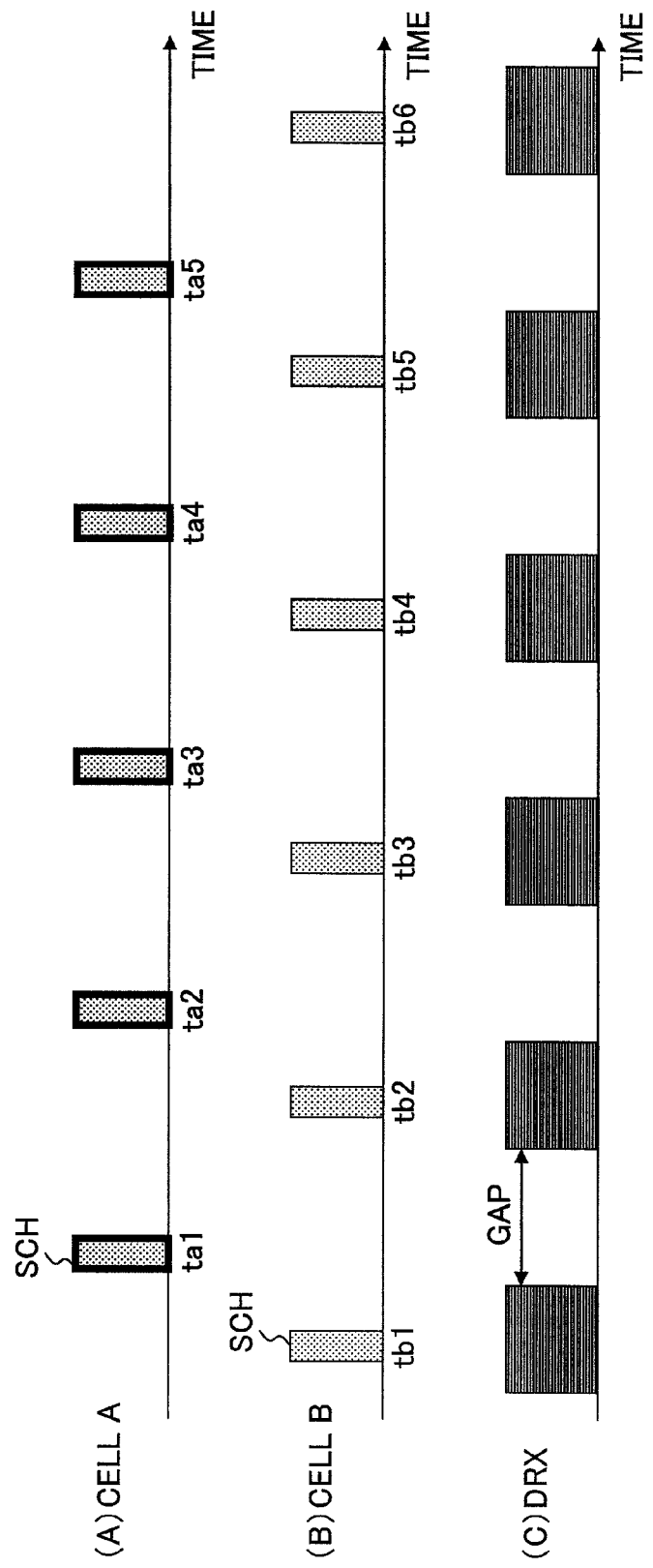
FIG. 14 shows a timing diagram illustrating an inappropriate measurement gap interval.
Figure 15:
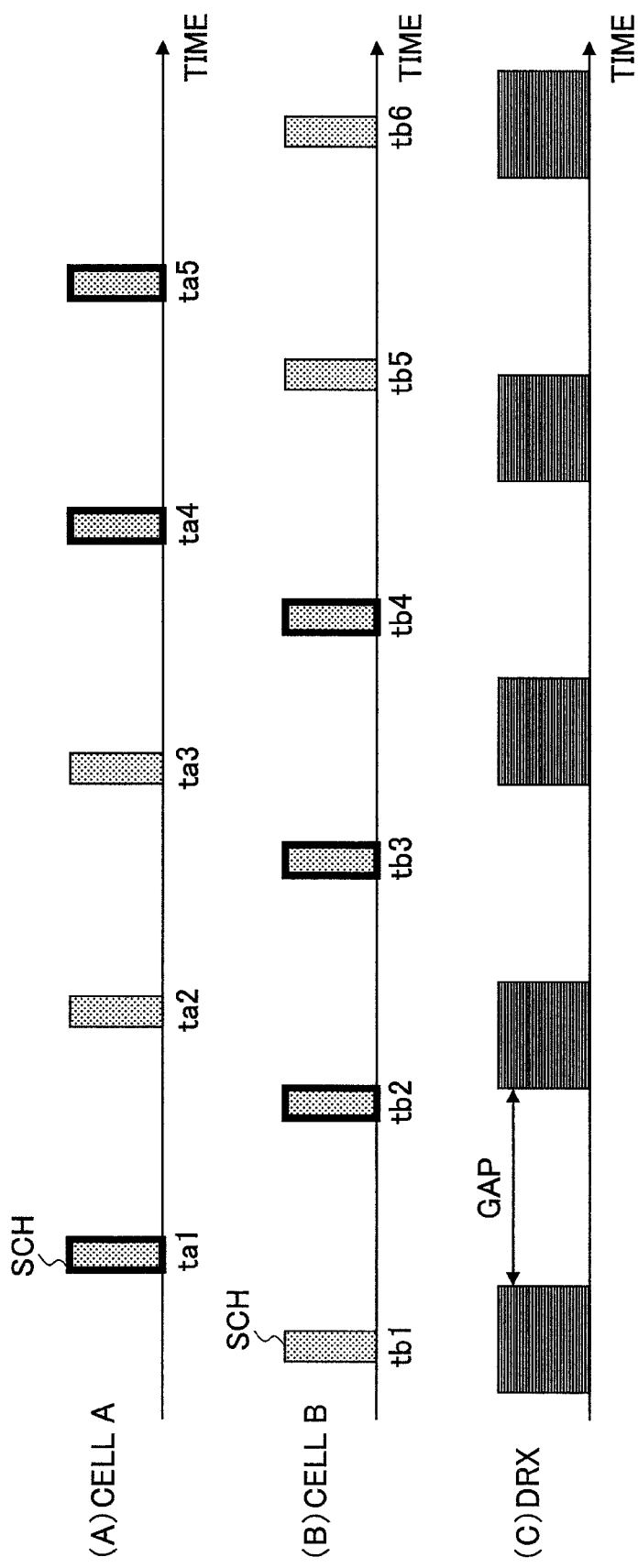
FIG. 15 shows a first timing diagram illustrating a measurement gap interval in accordance with an embodiment of the present invention.
Figure 16:
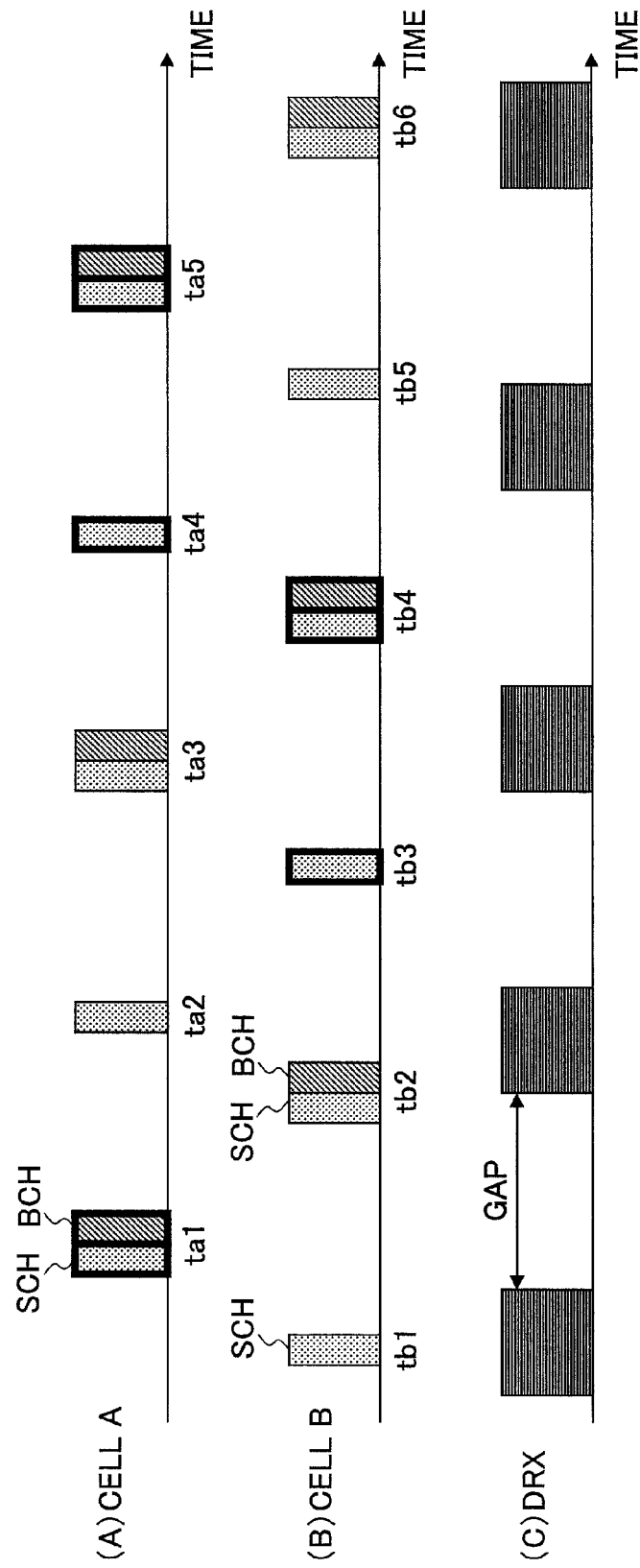
FIG. 16 shows a second timing diagram illustrating a measurement gap interval in accordance with an embodiment of the present invention.

With reference to FIGS. 14-16, a method for setting a discontinuous reception (DRX) interval when mobile communication systems with different frequencies coexist in the same geographical area. FIGS. 14-16 show timing diagrams illustrating the relationship between the transmission interval of the synchronization channel (SCH) in cells A and B and the DRX interval.

In FIG. 14, the transmission interval (for example, 5 ms) of the synchronization channel in the cells A and B is the same as the DRX interval (for example, 5 ms). When the measurement gap is placed, the user terminal can detect only cells which can be found during the measurement gap, since the user terminal performs cell search during the measurement gap. In FIG. 14, the synchronization channel in the cell A can be found during the measurement gap, while the synchronization channel in the cell B can never be found, since the synchronization channel in the cell B is not transmitted within the measurement gap.

In order to avoid this situation, it is necessary to shift the DRX interval from the interval of the synchronization channel. As shown in FIG. 15, when the DRX interval is set to 7 ms, for example, the user terminal can detect the synchronization channel in the cell A at the timings of ta1, ta4, and ta5. The user terminal can also detect the synchronization channel in the cell B at the timings of tb2, tb3, and tb4.

In addition, the broadcast channel (BCH) in addition to the synchronization channel may be needed for cell search (sell selection). Accordingly, it is also necessary to shift the DRX interval from the interval (for example, 10 ms) of the broadcast channel. As shown in FIG. 16, the user terminal can detect the synchronization channel in the cell B at the timing of tb2, however, the user terminal cannot detect the broadcast channel in the cell B at the timing of tb2, since the broadcast channel is not transmitted within the measurement gap. In FIG. 16, the DRX interval is also shifted from the interval of the broadcast channel. Accordingly, the user terminal can detect the cell A at the timings of ta1 and ta5 and detect the cell B at the timing of tb4.

As described above, when mobile communication systems with different frequencies coexist in the same geographical area, the discontinuous reception interval should be set a value other than multiples of the transmission interval of the channel (synchronization channel, broadcast channel, etc.) used for different-frequency measurement.

The present invention is not limited to these embodiments. The present invention may be modified within the scope of the claims. For example, although the above-mentioned embodiments focus on the case where the user terminal performs different-frequency measurement, the present invention is also applicable to the case where the user terminal performs measurement for different radio access technologies (RATs). In addition, the present invention is also applicable to the case where the user terminal starts data transmission or reception while the user terminal is performing different-frequency measurement during DRX the idle status. In this case, the gap request or the gap release request is transmitted in the procedure for initial access (the establishment of the RRC bearer or the radio bearer), when data are generated.

This international patent application is based on Japanese Priority Application No. 2007-073736 filed on Mar. 30, 2007 and Japanese Priority Application No. 2007-320218 filed on Feb. 11, 2007, the entire contents of which are incorporated herein by reference.

The invention claimed is:

1. A communication control method used by a base station to allocate a radio resource to a user terminal which performs different-frequency measurement, comprising the steps of:
   transmitting to the base station, by the user terminal, a request indicating whether a measurement gap for different-frequency measurement is needed, as a measurement report of an RRC protocol indicating a propagation level of the base station, when a need for data communications between the user terminal and the base station arises while the user terminal is performing discontinuous reception; and
   controlling, by the base station, the radio resource allocated to the user terminal based on whether the measurement gap is needed, wherein:
   an RRC message indicating that the measurement gap is needed comprises a measurement report which is transmitted under the following conditions:
   when a propagation level is below a predetermined threshold;
   when the measurement gap is not allocated; and
   when a persistent scheduling mode in which data are periodically transmitted using predetermined radio resources is used and retransmission data are transmitted between timings of discontinuous reception when retransmission is needed, while a discontinuous reception mode is applied.

2. The communication control method as claimed in claim 1, wherein:
   the step of transmitting comprises transmitting a gap request indicating that the measurement gap is needed, when the user terminal receives information that downlink data from the base station are generated while the user terminal is performing different-frequency measurement.

3. The communication control method as claimed in claim 1, wherein:
   an RRC message indicating that the measurement gap is needed comprises a measurement report which is transmitted under the following conditions:
   when a propagation level is below a predetermined threshold;
   when the measurement gap is not allocated; and
   when there is not enough duration to perform different-frequency measurement between reception timings of control signals during discontinuous reception.

4. The communication control method as claimed in claim 1, wherein:
   an RRC message indicating that the measurement gap is not needed comprises a measurement report which is transmitted under the following conditions:
   when a propagation level is above a predetermined threshold;
   when the measurement gap is allocated; and
   when there is not enough duration to perform different-frequency measurement between reception timings of control signals during discontinuous reception.

5. The communication control method as claimed in claim 1, wherein:
   an RRC message indicating that the measurement gap is not needed comprises a measurement report which is transmitted under the following conditions:
   when a propagation level is above a predetermined threshold;
   when the measurement gap is allocated; and
   when the user terminal is in a continuous reception mode.

6. The communication control method as claimed in claim 1, wherein:
   an RRC message indicating that the measurement gap is not needed comprises a measurement report which is transmitted under the following conditions:
   when a propagation level is above a predetermined threshold;
   when the measurement gap is allocated; and
   when a persistent scheduling mode is used.

7. The communication control method as claimed in claim 1, wherein:
   the step of controlling comprises controlling the radio resource allocated to the user terminal based on QoS for data communications, when the measurement gap is needed.

8. The communication control method as claimed in claim 1, further comprising the step of:
   transmitting to the user terminal, by the base station, information indicating whether the request should be transmitted, wherein
   the step of transmitting the request comprises transmitting the request when the information indicates that the request should be transmitted.

9. The communication control method as claimed in claim 8, wherein:
   the information indicating whether the request should be transmitted is transmitted as a MAC control PDU or an RRC message on a broadcast channel or a dedicated control channel.

10. A base station for allocating a radio resource to a user terminal which performs different-frequency measurement, comprising:
    a receiving unit configured to receive from the user terminal a request indicating whether a measurement gap for different-frequency measurement is needed, as a measurement report of an RRC protocol indicating a propagation level of the base station, when a need for data communications with the user terminal arises while the user terminal is performing discontinuous reception; and
    a scheduling unit configured to control the radio resource allocated to the user terminal based on whether the measurement gap is needed, wherein:
    an RRC message indicating that the measurement gap is needed comprises a measurement report which is transmitted under the following conditions:
    when a propagation level is below a predetermined threshold;
    when the measurement gap is not allocated; and
    when a persistent scheduling mode in which data are periodically transmitted using predetermined radio resources is used and retransmission data are transmitted between timings of discontinuous reception when retransmission is needed, while a discontinuous reception mode is applied.

11. A user terminal for performing different-frequency measurement, comprising:
- a request transmitting unit configured to transmit a request indicating whether a measurement gap for different-frequency measurement is needed, as a measurement report of an RRC protocol indicating a propagation level of a base station, when a need for data communications with the base station arises while the user terminal is performing discontinuous reception; and
- a receiving unit configured to receive data with a radio resource which is allocated based on whether the measurement gap is needed, wherein:
- an RRC message indicating that the measurement gap is needed comprises a measurement report which is transmitted under the following conditions:
- when a propagation level is below a predetermined threshold;
- when the measurement gap is not allocated; and
- when a persistent scheduling mode in which data are periodically transmitted using predetermined radio resources is used and retransmission data are transmitted between timings of discontinuous reception when retransmission is needed, while a discontinuous reception mode is applied.

* * * * *